United States Patent [19]
Ochiai et al.

[11] 3,930,875
[45] Jan. 6, 1976

[54] PUMP MEMBER FOR MOLTEN METAL

[75] Inventors: Toshihiko Ochiai; Mitsutoshi Hirano, both of Yokohama; Hiroshi Inoue, Kawaguchi, all of Japan

[73] Assignee: Tokyo Shibaura Electric Co., Ltd., Kawasaki, Japan

[22] Filed: Apr. 24, 1973

[21] Appl. No.: 354,133

[30] Foreign Application Priority Data
Apr. 25, 1972 Japan.................................. 47-40875

[52] U.S. Cl................. 106/65; 106/73.2; 106/73.4
[51] Int. Cl............................................. C04b 35/58
[58] Field of Search..................... 106/65, 73.2, 73.4

[56] References Cited
UNITED STATES PATENTS
3,108,887 10/1963 Lenie et al............................ 106/65

*Primary Examiner*—J. Poer
*Attorney, Agent, or Firm*—Kemon, Palmer & Estabrook

[57] ABSTRACT

A pump member for molten metal manufactured from a sintered mass including aluminium nitride as a major component and 0.1 to 10% by weight of at least one oxide selected from the group consisting of oxides of Group IIIA elements of the Periodic Table.

7 Claims, 7 Drawing Figures

F I G. 1
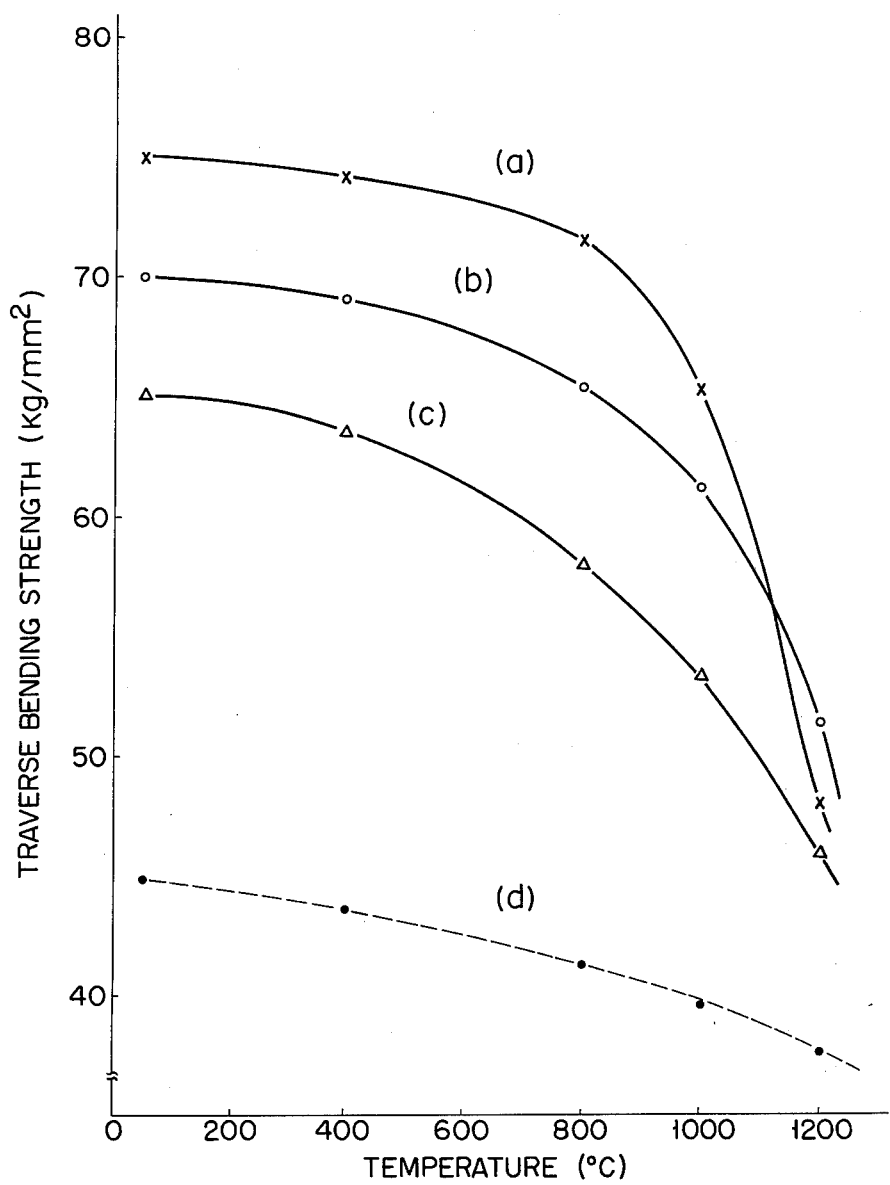

F I G. 2A
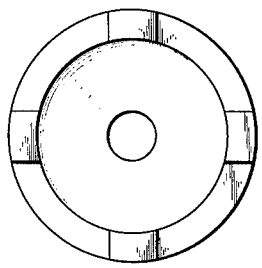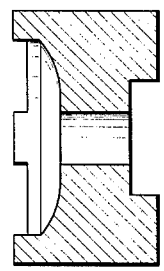
F I G. 2B
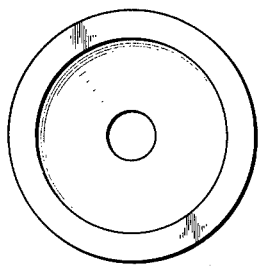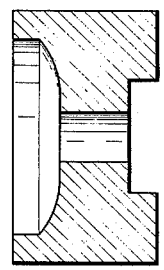
F I G. 3
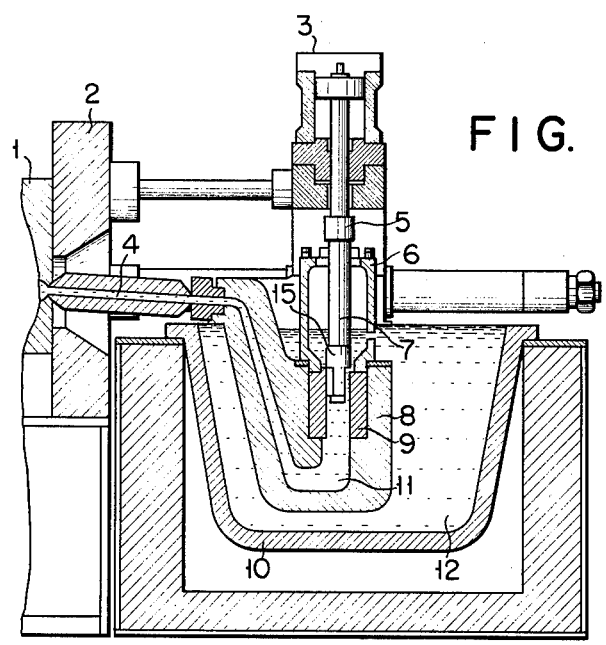

PUMP MEMBER FOR MOLTEN METAL

BACKGROUND OF THE INVENTION

This invention relates to a pump member using a novel ceramic material excellent in non-fusibility to a molten metal, and particularly to a pump member applicable to a hot-chamber type aluminium die casting machine.

In an aluminium die casting, a cold-chamber type die casting machine is generally used. Aluminium is molten in a vessel made of a heat-resistant metal or graphite. The molten aluminium is scooped with a ladle and poured into an injection sleeve coupled to a casting mold, followed by being compressed by a plunger to permit the molten aluminium to be introduced into the casting mold.

However, there are the following disadvantages.

The operation of manually pouring the molten aluminium from the vessel into the sleeve is very dangerous. This manual operation presents a bar in enhancing the productivity and operability of castings.

When the molten aluminium is poured into the injection sleeve, a temperature gradient of the molten aluminium is created between the section near to the inner wall surface of the sleeve and the central portion of the sleeve, since the sleeve is lower in temperature than the molten aluminium. In this way, the molten metal having such temperature gradient is introduced into the casting mold and then an aluminium casting is effected in a state different in the temperature of the molten metal, failing to obtain dense and uniform castings. Furthermore, cracks, waviness or blisters due to the penetration of gases are likely to be formed in the castings.

The conventional plunger and sleeve material should be normally preheated to 300° to 350° C and kept at this temperature, since it is impossible from the standpoint of their heat shock resistance and strength to rapidly heat them from room temperature up to the melting temperature of aluminium.

Furthermore, the compressing force of the molten metal is, of necessity, of the order of about 2 tons/cm$^2$, since the molten metal has a temperature gradient during pouring into the sleeve and, during injection, is rapidly lowered in its temperature.

The conventional sleeve and plunger material are more or less under attack by the molten aluminium and, in an attempt to prevent their fusibility to the molten aluminium and attain a lengthy service life, the associated wall surfaces of the sleeve and plunger are coated with a coating material consisting of a mixture of graphite and oil. The coating material is found helpful in preventing the fusibility of these members to the molten aluminium. During compression, however, the oil is decomposed into carbons and hydrogens due to the heat of the molten aluminium. The hydrogen so formed is liable to be adsorbed in the aluminium, resulting in pin-holes and blisters being formed in castings.

As will be understood from the above, the cold-chamber type aluminium die casting machine has a variety of disadvantages. These disadvantages will be able to be almost all overcome if a hot-chamber type die casting machine as already realized in a low melting point metal die casting is realized in an aluminium die casting.

However, a hot-chamber type aluminium die casting has not been realized to date, since there is formed no material having a heat resisting strength, heat shock resistance and wear resistance sufficient to be usable at a temperature near to an aluminium casting temperature (the melting temperature of the aluminium is of the order of 660°C) and not attacked by a molten aluminium.

The plunger and sleeve acting as a pipe for supplying a molten aluminium from the vessel into a casting mold are required to be both corrosion-resistant and non-fusible to the molten aluminium, even if the molten metal is directly poured, as well as be excellent in a heat shock resistance, high temperature strength and wear resistance.

With the hot-chamber type die casting machine it may safely be said that the plunger and sleeve functions as the heart of the machine. If there is any fault or damage of this section, the machine will not work as a whole.

To manufacture aluminium castings at a relatively low cost, it will be necessary from the commercial point of view to use a plunger and sleeve sufficient to be serviceable at more than 100,000 shots. From the above it will be understood that a variety of outstanding characteristics are required in realizing a hot-chamber type die casting machine.

SUMMARY OF THE INVENTION

Accordingly, an object of this invention is to provide a pump member for molten metal as manufactured from a novel material having characteristics far superior to a conventional pump member.

According to this invention there is provided a pump member whose at least molten metal contacting surface is formed from an aluminium nitride sintered mass including 0.1 to 10% by weight of at least one oxide selected from the group of oxides of Group IIIA elements of the Periodical Table.

BRIEF DESCRIPTION OF THE DRAWING

FIG. 1 indicates characteristic curves showing a relation between the traverse bending strength and the temperature of a pump member according to this invention;

FIGS. 2a and 2b are cross sectional views of samples used in wear resistance tests;

FIG. 3 is a cross sectional view showing a pump mechanism of a die casting machine into which the pump member according to this invention is incorporated;

DETAILED DESCRIPTION OF THE INVENTION

Figure 4:
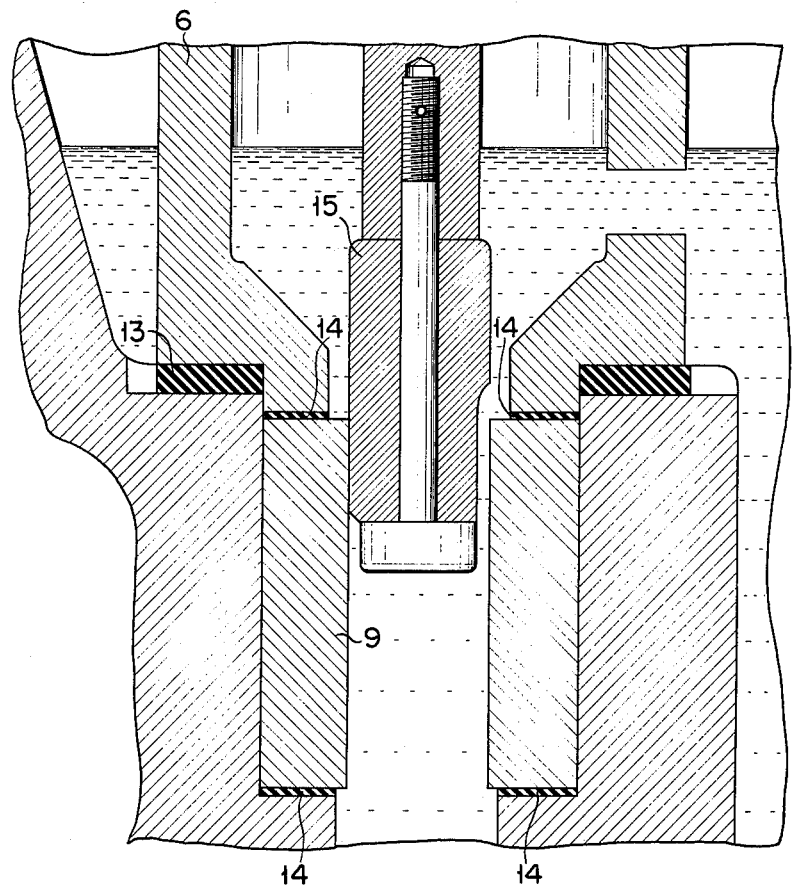
FIG. 4 is a cross sectional view showing a plunger and sleeve section of the die casting machine of FIG. 3.

A pump member according to this invention is formed by sintering a composition consisting of aluminium nitride as a major component and 0.1 to 10%, or preferably 0.2 to 4.5%, of one or more oxides selected from the group of oxides of the Group IIIA elements of the Periodical Table. Very important is the fact that this pump member is almost free from attack by molten aluminium. A most important feature of the pump member according to this invention resides in that it is both corrosion-resistant and non-fusible to aluminium which is strong in affinity for the other materials or elements.

Since the pump member of this invention is corrosion-resistant and non-fusible to aluminium, it has a much more lengthy service life as compared with a conventional one. Such desirable characteristics are favorably conducive to the other characteristics as required during the operation at a high temperature. That is, molten aluminium exhibits, during the operation at high temperature, an almost complete corrosion-resistance and non-fusibility to the pump member, resulting in no degeneration of strength, hardness and the other characteristics of the pump member due to fusion or corrosion.

The fact that the pump member of this invention is almost free from attack by molten metal, particularly molten aluminium, is principally responsible for the inherent characteristics of the materials from which the pump member is formed. Particularly important is the fact that it is formed from a high density sintered mass.

When a composition consisting of aluminium nitride as a major component and 0.1 to 10%, preferably 0.2 to 4.5%, of oxide or oxides of Group IIIA elements is sintered, formation and growth of a fibrous texture are observed. Since the components constituting a fibrous texture are molten at a lower temperature than a sintering temperature, during sintering they are in a semi-molten state, which is believed useful to attain a high densification of the sintered mass.

It was found that, when 0.2 to 8% of aluminium nitride of the aforesaid composition is replaced, based on the whole weight of the sintered mass, by at least one kind selected from the group of metal silicates, the deviation in strength of the sintered mass can be reduced as will later be described. It is because that this replacement is believed helpful in more homogenizing the fibrous texture. Since a sintered mass having a homogeneous texture is obtained, the replacement is desirable from the standpoint of the fusibility of aluminium.

Further replacement, by $Al_2O_3$, of 10% of aluminium nitride of the foregoing composition based on the whole weight of the sintered mass proved that the surface texture of the resultant sintered mass is further densified and that its non-fusibility to aluminium is more enhanced. The $Al_2O_3$ serves to dispersion-strengthen the sintered mass and prohibit a grain growth in the sintered mass, resulting its fibrous texture and the other textures being small as a whole and uniform in its shape.

Let us now explain the strengths of the pump member according to this invention. The traverse bending strength of the pump member is of the order of more than 50 kg/mm$^2$ at room temperature and an average value of about 62 kg/mm$^2$ was presented when 100 kinds of samples are tested by changing the material composition, sintering conditions and sintering methods in a variety of ways. The tensile strength is of the order of 25 kg/mm$^2$ to 30 kg/mm$^2$ (average) at normal temperature and the compression strength is 350 kg/mm$^2$ (average) at normal temperature. The sintered mass, from which the pump member according to this invention is formed, is hardly lowered in its strengths up to a high temperature of about 800°C, and it is less lowered in its strength even at a high temperature near to 1200°c. One example is shown in FIG. 1.

FIG. 1 indicates characteristic curves showing a relation between the traverse bending strength and the temperature of the sintered mass from which the pump member of this invention is formed. In the Figure, a curve a shows the characteristic curve of a sample sintered mass consisting of aluminium nitride as a major component, 0.5% of yttrium oxide, 3% of $\beta$-$SiO_2$ and 4% of $Al_2O_3$; a curve b the characteristic curve of a sample aluminium nitride sintered mass including 0.5 weight percent of yttrium oxides; a curve c the characteristic curve of a sample aluminium nitride sintered mass including 0.5 weight % of cerium oxide and a curve d, by way of comparison, the characteristic curve of a sintered mass of aluminium nitride only.

From the Figure it will be understood that the sintered mass applicable to the pump member of this invention is hardly varied in its strengths up to a temperature of 800° to 1000°C and has a high temperature strength well sufficient to be used as a pump material. That is, a stress developed in a pump member for use in a hot-chamber type die casting apparatus is believed to correspond to a tension force of 5 kg/mm$^2$ (max.) at a normal static pressure. Even if a rapid pressure raising is encountered, it is said to be about 3 to 4 times the pressure at a normal time, and therefore it may be sufficient if there is a high temperature tension strength of 20 kg/mm$^2$ (max.)

The pump member of this invention whose normal temperature tensile strength is of the order of 25 to 30 kg/mm$^2$ (average) and whose tensile strength is not appreciably varied even at high temperature may have a strength well sufficient to be used as a hot-chamber type pump member. Since means for preventing a rapid raising of molten metal pressure is mounted in a conventional pump member, it is said that the pump member may be used as such if it can withstand a stress of 10 to 15 kg.

Even considered from this viewpoint it will be understood that the pump member of this invention is effectively serviceable.

Considering the aforesaid compositions from the standpoint of strengths, the composition consisting of aluminium nitride as a major component and 0.1 to 10% of at least one oxide selected from the group of oxides of Group IIIA elements of the Periodical Table shows an enhanced strengths about 2 times that of a sintered mass prepared from aluminium nitride only. Even when the composition is varied in this range, almost all show a traverse bending strength of more than 50 kg/mm$^2$ at normal temperature. In this case, however, the strength of the sintered mass may be deviated within the range of about 10% due to an influence from the other sintering conditions, grain size requirement etc. However, replacing 0.2 to 8% of aluminium nitride of the aforesaid composition, based on the whole weight of the sintered mass, by at least one kind selected from the group consisting of metal silicates results in the strength being enhanced by about 10%. Furthermore, the deviation of strength can be kept down to below 5% with the consequent advantage.

To mention a hardness, the pump member of this invention shows a Vickers' hardness of 1300 to 1500 HV. Particularly, even when aluminium nitride, at least one oxide of Group IIIA elements of the Periodical Table, or metal silicates are varied in their respective ranges, a value of 1300 to 1400 HV is presented and no appreciable difference is observed. However, below 10% of aluminium nitride of the aforesaid composition is replaced, based on the whole weight of the sintered mass, by $Al_2O_3$ it is observed that a hardness is enhanced to 1400 to 1500 HV, sometimes more than 1500 HV. Since the pump member, i.e. a slidable member, of this invention is, in this way, improved in its wear resistance, it will be appreciated that the replacement by $Al_2O_3$ contributes much to the lengthy service life of the pump member.

The following explanation is directed to a thermal shock resistance. Samples formed from the compositions of a pump member according to this invention were repeatedly tested under the thermal shock conditions that they are heated for 5 minutes at 1100°C and then forcedly air-cooled in the atmosphere. Even after tests of more than 100 cycles, no phenomenon such as generation of cracks was observed in the tested samples. When the components of the compositions were varied within their respective ranges, a critical thermal shock temperature difference ($\Delta Tc$) was found to be 270° to 300°C. Taking into consideration the other ceramics, for example, alumina-whose $\Delta Tc$ is about 200°C-, beryllia-whose $\Delta Tc$ is 230°C-and so on, this critical thermal shock temperature difference is fairly high and is therefore considered to be able to satisfy a thermal shock resistance sufficient to be used as a pump member.

To explain a frictional coefficient, friction tests were conducted, at a frictional speed of 70 m/sec. and under a load of about 190g, on a rotational disc prepared by applying a hard chromium plate onto an ordinary structural rolled steel. The results of the tests showed that the frictional coefficient of any of samples is in the range of 0.15 to 0.26. Furthermore, Young's modulus was found to be 2.1 to $3.2 \times 10^4$ kg/mm².

As will be evident from the above, the pump member according to this invention has a variety of outstanding characteristics and is believed to be usable as a pump member for a hot-chamber type aluminium die-casting machine which has heretofore not been realized.

The function of each component of the above-mentioned compositions will be explained below in connection with the characteristics.

First of all, aluminium nitride as a major component, when sintered into a high density sintered mass, plays a most important part in outstanding non-fusibility and excellent corrosion resistance to molten metal, particularly molten aluminium.

The oxide of Group IIIA elements of the Periodical Table serves to promote, in a state co-existant with aluminium nitride, formation and growth of the fibrous texture in the sintered mass. The oxide of Group IIIA elements is added in a range of 0.1 to 10%, preferably in a range of 0.2 to 4.5%. Addition of below 0.1% is not conducive to a high densification of the sintered mass and the growth of a fibrous texture is not observed. Addition of the oxide of Group IIIA elements in an excessive amount results in degeneration of characteristics inherent in aluminium nitride. Therefore, the oxide of Group IIIA elements is added to the extent not exceeding 10%, preferably in an amount of below 4.5%. Among oxides of Group IIIA elements, $Y_2O_3$ exhibits a most desirable effect. $La_2O_3$, $Sc_2O_3$, $Ce_2O_3$ etc. are also found desirable. In this way, the sintered mass of these compositions can easily attain its high densification and it is possible to obtain a sintered mass excellent in non-fusibility to molten metal, particularly molten aluminium, as well as excellent in its strength and the other characteristics.

Replacing 0.2 to 8% of aluminium nitride of the aforesaid composition, based on the whole weight of the sintered mass, by at least one kind selected from the group of metal silicates further promotes formation of the fibrous structure, resulting in a sintered mass less in the deviation of strength. Since the strength of each part in the same sintered mass is more uniform, it is very effective to obtain a relatively large-sized sintered mass such as a pump member of this invention. As metal silicates, use may be made of, in a single or combination form, silicon oxide, aluminium silicate, magnesium silicate, calcium silicate and naturally occurring ones containing silicon oxides, for example, feldspars, augites, olivines or micas. The metal silicate is added in an amount of 0.2 to 8%. Addition of below 0.2% does not serve to reduce the deviation of strength, nor does it serve to enhance the strength of the sintered mass. Upon an excessive addition, the thermal shock resistance of the sintered mass is liable to be degenerated and the metal silicate is added to the extent not exceeding 8%. Most preferably, addition of below 5% results in no degeneration of thermal shock resistance.

An influence due to the addition of $Al_2O_3$ is not yet theoretically clarified to the full satisfaction. It is, however, established that the $Al_2O_3$ is not in a state solid-soluted with the other structural components, but is dotted in a grain foundary etc. It is found that the grain size of the sintered mass including the fibrous structure tends to be miniaturized due to the presence of $Al_2O_3$. The $Al_2O_3$, even when added in a minute amount of about 0.05%, exhibits some effect. However, $Al_2O_3$ is added preferably in a range of 0.5 to 5% and addition of below 10% works effectively. When $Al_2O_3$ is added in a larger amount, $Al_2O_3$ tends to be flowed out on the surface of the sintered mass, undesirably causing a possible degeneration of the characteristics of the sintered mass.

Gathering from the fact that the addition of $Al_2O_3$ contributes much to the suppression of a grain growth, use may be made, as additives, of beryllium oxide, zirconium oxide, thorium oxide, magnesium oxide, chromium oxide, cobalt oxide, vanadium oxide, titanium oxide etc.

As sintering conditions for obtaining a pump member according to this invention, a hot-press sintering or a normal sintering may be effected at a temperature of 1600° to 2200°C in a nitrogen or the other non-oxidizing atmosphere. A variety of conditions may be combined within the above sintering conditions. However, sintering should be effected taking into account the densification and homogenization of a sintered mass.

Let us now explain a corrosion resistance and wear resistance to molten aluminium both of which are the outstanding characteristics of the pump member according to this invention. Pellet-shaped samples having a diameter of 30 mm and a thickness of 6 mm were prepared by varying the composition of the sintered mass including aluminium nitride as a major component from which the pump member of this invention is formed (Each composition is shown in Table 2). Both end surfaces of the pellet were polished, by a diamond paste, to the surface roughness of about $0.2\mu$ substantially the same as that of a finished pump member. Then, each sample was immersed into molten aluminium and, after lapse of a predetermined time, the loss of weight due to corrosion was determined.

Use was made of molten aluminium whose components are shown in Table 1. These components were molten in an amount of 1 to 6 kg in a ceramic crucible having an inner diameter of 85 mm and a height of 170 mm, and was kept to 660°C±5°C. The results of the tests, together with the components of each composition, are shown in Table 2.

Table 1

| Cu | Si | Mg | Zn | Fe | Mn | Ni | Sn | Al |
|---|---|---|---|---|---|---|---|---|
| 1.5 ⟶ 3.5 | 10.5 ⟶ 12.0 | <0.3 | <1.0 | <0.9 | <0.5 | <0.5 | <0.3 | balance |

Table 2

| Sample No. | Components | Composition (weight %) | Loss of weight (mg) involved with a lapse of immersion time |||||
|---|---|---|---|---|---|---|
| | | | 110 hours | 200 hours | 400 hours | 800 hours |
| 1 | AlN (comparison example) | 100 | 2.7 | — | — | — |
| 2 | AlN<br>$Y_2O_3$ | 99.5<br>0.5 | 0.2 | 0.2 | 0.3 | 0.5 |
| 3 | AlN<br>$Ce_2O_3$ | 99.5<br>0.5 | 0.8 | 0.9 | 1.2 | 2.0 |
| 4 | AlN<br>$Sc_2O_3$ | 99.5<br>0.5 | 0.2 | 0.3 | 0.5 | 0.7 |
| 5 | AlN<br>$La_2O_3$ | 99.5<br>0.5 | 0.3 | 0.3 | 0.5 | 0.8 |
| 6 | AlN<br>$Y_2O_3$ | 98<br>2 | 0.3 | 0.3 | 0.5 | 0.7 |
| 7 | AlN<br>$Y_2O_3$ | 95<br>3 | 0.2 | 0.3 | 0.4 | 0.9 |
| 8 | AlN<br>$Y_2O_3$ | 90<br>10 | 0.4 | 0.4 | 0.5 | 0.8 |
| 9 | AlN<br>$Y_2O_3$<br>$\beta$-$SiO_2$ | 96.5<br>0.5<br>3 | 0.2 | 0.3 | 0.4 | 0.5 |
| 10 | AlN<br>$Y_2O_3$<br>$\beta$-$SiO_2$ | 95<br>2<br>3 | 0.3 | 0.3 | 0.4 | 0.5 |
| 11 | AlN<br>$Y_2O_3$<br>$Mg_2SiO_4$ | 95<br>2<br>3 | 0.3 | 0.4 | 0.4 | 0.5 |
| 12 | AlN<br>$Sc_2O_3$<br>$\beta$-$SiO_2$<br>$Al_2O_3$ | 94.5<br>0.5<br>3<br>6 | 0 | 0.2 | 0.2 | 0.3 |
| 13 | AlN<br>$Y_2O_3$<br>$\beta$-$SiO_2$<br>$Al_2O_3$ | 90.5<br>0.5<br>3<br>6 | 0.1 | 0.1 | 0.3 | 0.4 |
| 14 | AlN<br>$Y_2O_3$<br>$\beta$-$SiO_2$<br>$Al_2O_3$ | 86.5<br>0.5<br>3<br>10 | 0.1 | 0.2 | 0.2 | 0.4 |

In Table 2, a sintered mass (Sample No. 1) consisting of AlN only is shown by way of comparison. As is evident from the test results shown in Sample No. 1 the weight of loss after lapse of 110 hours is 2.7 mg. The surface roughness substantially corresponds to 1S based on the JIS surface roughness requirement and was found to be fairly rough. Furthermore, the edge portions of the sample were broken off and the sample was judged unsuitable for a pump member.

According to Sample Nos. 2 to 14 of this invention the weight of loss, due to corrosion, after lapse of 800 hours is in a range of 0.3 to 2.0 mg and it was found that these samples are hardly corroded by molten aluminium. The end surface or edge portion of each sample was not broken off. Before measurement of the weight of loss due to corrosion, attempts were made to remove aluminium deposited onto the surface of each sample and it was found that it could be easily peeled off from the sample surface. From these it will be understood that the aluminium is deposited merely i.e. not intimately, onto the sample surface. The surface of each sample after immersion was observed through an X-ray micro-analyzer and no change was observed. The surface roughness of each sample after 800 hours immersion corresponds to 0.3 to 0.5S and it was found that each sample presents no obstacle in using it as a pump member.

In an attempt to examine the wear resistance of the pump member according to this invention, the following tests were conducted.

Sintered articles shown in plan views and cross-sectional views in FIGS. 2A and 2B were prepared. The sintered article (hereinafter referred to as a fixed sample) shown in FIG. 2A is fixed and the sintered article (hereinafter referred to as a rotatable sample) shown in FIG. 2B is abutted against the fixed sample in a manner to permit it to be slidably moved. At the peripheral portion of one end of the fixed sample of 40 mm$\phi$ × 15 mm are provided four projections having a dimension of 5 mm × 5 mm × 5 mm. At the central portion of the fixed sample is provided a bore for supporting it. The rotatable sample has an annular projection of 5 mm in width at the outer peripheral portion of one end thereof and a circular bore at the central portion thereof, the circular bore being arranged concentric with the annular projection and adapted to support the rotatable sample. In a molten aluminium was fixed the fixed sample whose four projections were abutted against the annular projection in a manner to permit the rotatable sample to be slidably rotated. The rotatable sample was rotated at a revolution speed of 94 rpm and under a sliding load of 5 kg/cm$^2$ or 10 kg/cm$^2$. At this time, the temperature of the molten aluminium was kept to 680°C±5°C. Under such conditions tests were conducted for 5 hours and the dimension of each projection of the fixed and rotatable samples was measured using a micrometer. As test samples use was made of compositions shown in Table 3. The amount of wear of each sample shown in Table 3 is shown in Table 4.

Table 3

| Sample No. | Components |||| Composition (wt %) ||||
|---|---|---|---|---|---|---|---|---|
| | 1st | 2nd | 3rd | 4th | 1st | 2nd | 3rd | 4th |
| 1 | AlN | $Y_2O_3$ | — | — | 99.5 | 0.5 | — | — |
| 2 | AlN | $La_2O_3$ | — | — | 99.0 | 1.0 | — | — |
| 3 | AlN | $Ce_2O_3$ | — | — | 99.5 | 0.5 | — | — |
| 4 | AlN | $Sc_2O_3$ | — | — | 98.0 | 2.0 | — | — |
| 5 | AlN | $Y_2O_3$ | $\beta$-$SiO_2$ | — | 96.5 | 0.5 | 3.0 | — |
| 6 | AlN | $Y_2O_3$ | $\beta$-$SiO_2$ | $Al_2O_3$ | 92.5 | 0.5 | 3.0 | 4.0 |

Table 4

| Sample No. | Test load (kg/cm²) | Amount of wear (thickness) (mm) | |
|---|---|---|---|
| | | Fixed sample | Rotatable sample |
| 1 | 5 | 0.03 | 0.01 |
| | 10 | 0.07 | 0.02 |
| 2 | 5 | 0.03 | 0.01 |
| | 10 | 0.08 | 0.02 |
| 3 | 5 | 0.04 | 0.01 |
| | 10 | 0.08 | 0.03 |
| 4 | 5 | 0.03 | 0.02 |
| | 10 | 0.07 | 0.03 |
| 5 | 5 | 0.03 | 0.01 |
| | 10 | 0.06 | 0.03 |
| 6 | 5 | 0.02 | 0.01 |
| | 10 | 0.05 | 0.02 |

As will be evident from the results shown in Table 4, the amount of wear of each sample tested under such severe conditions is very slight and it was established that these samples have a characteristic well sufficient to be used as a pump member for molten metal. It is needless to say that a pump member can attain the object of this invention only if at least molten metal contacting surface of the pump member is formed from each of said sintered mass including aluminium nitride as a major component.

A pump mechanism as applied to a hot-chamber type die casting machine used in the following Examples will be explained by reference to FIGS. 3 and 4. FIG. 3 is a cross sectional view showing the pump mechanism and FIG. 4 is a cross sectional view showing a plunger and a sleeve portion.

In these Figures, 1 shows a mold; 2 a die cast body; 3 a hydraulic cyclinder; 4 a nozzle; 5 a coupling; 6 a pressing member; 7 a plunger shaft; 8 a pump body; 9 a sleeve; 10 a heat retaining furnace; 11a crank bolt; 12 a molten metal; 13 a seal ring; 14 a gasket and 15 a plunger. The sleeve 9 is incorporated into the pump body 8 together with the pressing member, seal ring 13 and gasket 14. The plunger 15 connected through the coupling 5 to the hydraulic cylinder 3 can be inserted into the sleeve. The molten metal within the heat retaining furnace 10 is introduced into the sleeve 9 through a cutout portion provided in the peripheral surface of the plunger 15. When the plunger 15 is moved downwardly through the actuation of the hydraulic cylinder 3 the molten metal within the sleeve 9 is supplied through the nozzle 4 into the mold mounted to the die cast body 2.

When a pump member according to this invention is used in place of the sleeve 9 and plunger 15 of the pump mechanism, the following consideration is necessary. Parts other than the sleeve and plunger, for example, the pump body 8 and pressing member 6 etc., assume an intricate shape and are of necessity made of a heat resisting cast iron. However, clearances may be created between these parts due to a greater difference in heat expansion coefficient between these parts. Since the pump mechanism is used particularly at a high temperature, these parts are greatly influenced due to heat expansion. In the pump mechanism used, the pressing member 6 is pressed by a spring (not shown) and the sleeve 9 is stably secured at all times to the pump body 8 by the urging force from the pressing member and no clearance is therefore created. During a supply under pressure of the molten metal 12, a high pressure is prevalent at the lower portion of the sleeve 9 and an even slight clearance will result in the flow out of the molten metal 12. As shown in FIG. 4, a springy gasket 14 made of a fibrous ceramic plate is disposed between the sleeve 9 and the pump body 8 and between the sleeve 9 and the pressing member 6. Between the pump body 8 and the pressing member 6 is disposed the seal ring 13 made of the material the same as that of the gasket. This arrangement prevents the molten metal from entering into a possible clearance created due to a difference in heat expansion between the parts of the pump mechanism.

EXAMPLE 1

To a substantially pure, powdered aluminium nitride as a major component, 0.5% by weight of powdered yttrium oxide based on the whole weight of a sintered mass, and then ethanol, were added. The mixture was blended and crushed in a ball mill to obtain mixed powders having an average particle size of 1μ. The mixed powders were, after drying, bound by an organic binder into granules. The granules were compressed compact by a hydrostatic press to obtain articles substantially corresponding in shape to the plunger and sleeve of the pump mechanism. The articles are, if necessary, corrected in their shape by machining etc. to obtain a sleeve having an outer diameter of 82 mmφ, an inner diameter of 43 mmφ and a height of 230 mm and a plunger having an outer diameter of 47 mmφ, an inner diameter of 15 mm and a height of 270 mm. The articles were heat treated for 90 minutes at a temperature of 700°C in a nitrogen atmosphere to completely remove the organic binder etc. Then, the articles were hot-press sintered using carbon molds. To explain in more detail the hot-press sintering was effected in a nitrogen atmosphere firstly at a pressure of 120 kg/cm² from room temperature up to 1600°C, then at the pressure gradually increased up to a final pressure of 350 kg/cm² with the temperature increased up to a final temperature of 1870°C, the final state being kept for 40 minutes. Thus, a black-colored, hot-pressed sintered mass satisfying a required density was obtained.

Figure 5A:
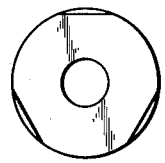
FIGS. 5a and 5b show, respectively, a plan view and a side cross-sectional view showing one embodiment of this invention.
Figure 5B:
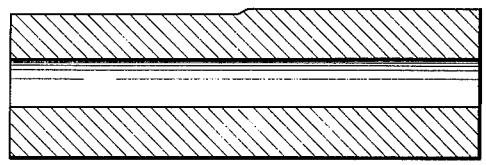

The dimension of the sintered mass so obtained was, in a case of a sleeve, 82.5 mmφ in outer diameter, 45 mmφ in inner diameter and 124 mm in height and, in a case of a plunger, 47.5 mmφ in outer diameter, 15 mmφ in inner diameter and 145 mm in height. Then, the sintered mass was grounded to a final article shape having, in a case of a sleeve, 80 mmφ in outer diameter, 45 mmφ in inner diameter and 120 mm in height and, in a case of a plunger, 44.97 mmφ in outer diameter, 16 mmφ in inner diameter and 142 mm in height. The inner peripheral surface of the sleeve was finally ground by a diamond to a surface roughness of the order of 0.2S. The outer peripheral surface of the plunger was partially cut off at three places at a regular interval to a depth of 3 mm to provide flat cutout portions, as shown in FIG. 5, which are used as an inlet for molten metal. The sliding portion of the outer peripheral surface of the plunger was ground by a diamond to a surface roughness of the order of 0.2S the same as that of the inner peripheral surface of the sleeve.

The resultant sleeve and plunger were incorporated into a pump mechanism and an aluminium die casting was conducted under the following conditions.

| | |
|---|---|
| injection pressure: | 200 kg/cm² |
| plunger moving speed: | 1.5 m/sec. |
| injection molding cycle: | 4 shots/min. |
| amount of injection: | 0.3 kg |

Application of the injection pressure was somewhat affected at shots exceeding 120,000 and the apparatus was stopped at 125,000 shots. Articles obtained in the neighborhood of 125,000 shots were somewhat bad in their casting skin as compared with that of the earlier ones. From this the pump member was judged as unsuitable for further operation.

Then, the plunger and sleeve were disassembled from the pump mechanism and it was found upon investigation that a clearance (0.03 mm at the start of the test) between the plunger and the sleeve was widened up to 0.3 mm after 125,000 shots.

From the above test results it will be appreciated that the pump member used in this Example is serviceable up to about 125,000 shots and is practically usable as a hot-chamber type pump member.

EXAMPLE 2

Densely compact sintered masses were formed in the same method as Example 1 from a mixture of aluminium nitride as a major component with 1% of yttrium oxide and 3% of $\beta$-$SiO_2$. From these were obtained a sleeve and plunger having the same shape and dimension as those of the counterparts of Example 1.

The sleeve and plunger were incorporated into the pump mechanism and an aluminium die casting was effected under the following conditions:

| | |
|---|---|
| plunger moving speed: | 1.5 m/sec. |
| injection molding pressure: | 250 kg/cm² |
| injection molding cycle: | 3 shots/min. |
| amount of injection: | 0.5 kg |

At 140,000 shots the pump member was judged as unsuitable for further operation.

EXAMPLE 3

Sintered masses were formed, in the same method as Example 1, from a mixture of aluminium nitride as a major component with 2% of yttrium oxide, 3.5% of magnesium silicate and 3.5% of aluminium oxide. From these were obtained a sleeve and plunger having the same shape and dimension as those of the counterparts of Example 1.

An aluminium die casting was effected under the same conditions as Example 1 and the pump member used was found well serviceable even at more than 130,000 shots.

In this Example, the injection pressure ceased to work at shots slightly exceeding 130,000 and an abrupt leakage of pressure occurred. The apparatus was stopped and cooled. Upon disassembling the apparatus it was found that a drop in pressure was caused due to the formation of a crack in the pump body.

The sleeve and plunger, upon investigation, showed no evidence of being corroded by aluminium. A clearance (0.03 mm at the start of the test) between the sleeve and the plunger was slightly widened up to 0.05 mm and they were found well serviceable for further operation.

EXAMPLE 4

To a powdered mixture of 92% of powdered AlN having an average particle size of 1.2$\mu$ with 5% of powdered $Y_2O_3$ having an average particle size of 1.6$\mu$ and 3% of powdered $Al_6Si_2O_{13}$ having an average particle size of 1.0$\mu$, 5% of stearic acid was added as a binder. The resultant mixture was, after stirring, shaped by a hydrostatic press, followed by machining to a predetermined shape. The shaped article was sintered for 1 hour at a temperature of 1800°C in a hydrogen air current of 2 l/min. The apparent density of the sintered mass was 3.34 g/cc which substantially corresponds to a true density. The traverse bending strength of this composition was found upon measurement to be 49.5 kg/mm².

The above sintered masses were machined to obtain a plunger and sleeve having the same shape and dimension as those of the counterparts of Example 1. An aluminium die casting was effected under the same conditions as Example 1 using the plunger and sleeve. It was found that they are usable even at more than 100,000 shots.

As will be understood from the above, the pump member according to this invention is well serviceable for a hot-chamber type aluminium die casting and marks an epock in the realization of a hot-chamber type aluminium die casting apparatus.

According to this invention, the drawbacks as encountered in a cold-chamber type aluminium die casting are all overcome. It is possible, according to this invention, to obtain bubble-free castings of fine and uniform structure extremely free from impurities. Furthermore, a variety of advantages such as a high productivity, high operability etc. can be obtained.

Though the pump member according to this invention is explained as applied to a hot-chamber type aluminium die casting apparatus, it can be applied equally to a cold-chamber type aluminium die casting apparatus. Since it is established that the pump member of this invention is not attacked by relatively low melting point metals such as zinc, magnesium etc., it can of course be applied to apparatus for die casting such metals.

What we claim is:

1. A pump member of a hot chamber type aluminium metal die casting machine which directly contacts molten aluminium metal in operation, consisting essentially of a sintered mass of a powdered mixture of the following ingredients in the percentages by weight indicated:

| | |
|---|---|
| rare earth oxide | 0.1 to 10% |
| metal silicate | 0.2 to 8% |
| aluminum oxide | 0 to 10% |
| aluminum nitride | balance, | wherein said metal silicate is selected from the group consisting of aluminium silicate, magnesium silicate, calcium silicate, feld spars, augites, olivines and micas.

2. The pump member of claim 1, wherein said rare earth oxide is selected from the group consisting of $Y_2O_3$, $La_2O_3$, $Sc_2O_3$ and $Ce_2O_3$.

3. The pump member of claim 2 wherein the amount of said metal silicate is 0.2 to 5% by weight.

4. The pump member of claim 3 wherein the amount of aluminium oxide is 0.5 to 5% by weight.

5. The pump member of claim 1 wherein the amount of aluminium oxide is 0.5 to 10% by weight.

6. The pump member of claim 1, wherein said sintered mass has a tensile strength at normal temperature of about 25 to 30Kg/mm$^2$.

7. The pump member of claim 1, wherein the amount of said rare earth oxide is between 0.2 to 4.5% by weight.

* * * * *